United States Patent Office 3,415,846
Patented Dec. 10, 1968

3,415,846
PREPARATION OF TRIOXABICYCLO OCTANES
George Kesslin, Teaneck, N.J., and Robert Wesley Handy, Stony Point, N.Y., assignors to Kay-Fries Chemicals, Inc., West Haverstraw, N.Y., a corporation of New York
No Drawing. Filed May 21, 1964, Ser. No. 369,275
7 Claims. (Cl. 260—340.7)

This invention relates to a novel process for the preparation of 2,6,7-trioxabicyclo (2,2,2) octanes.

The compounds of this invention have the generalized formula:

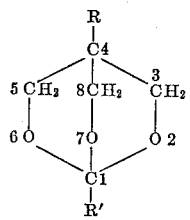

which would be called 4 - R,1 - R', 2,6,7 - trioxabicyclo (2,2,2) octane. The 2,6,7-trioxa refers to the oxygen atoms. They can be numbered as shown. Bicyclo refers to the presence of extra chain of $CH_2$—O—(7–8) atoms, which forms two cycles when combined as shown, with the first cycle (1–2–3–4–5–6) to form two "bridge-head" carbons (1 and 4). 2,2,2 refers to the two atoms, in this case C and O, between the two bridge head carbons. Since there are three of such groups, we have 2,2,2. Octane—since there are a total of eight atoms in the molecule the molecule is called an octane. R' stands for hydrogen or an aliphatic organic radical. R stands for an aliphatic organic radical. Such compounds are not well known. We have found only the following three references pertaining to the preparation of this class of compounds: Doering—J.A.C.S. 77—509 (1955); J. Org. Chem. 27—90 (1962); and J.A.C.S. 83—5036 (1961).

Trioxabicyclo octanes have been produced in the prior art by reacting a 1,1,1-trishydroxymethyl compound with an ortho ester, such as ethyl orthoformate. The exact method used to prepare these compounds is illustrated by Doering et al., J.A.C.S., vol. 77, page 512. Doering et al. reacted 1,1,1-trishydroxymethylethane with ethyl orthoformate, distilled off the ethanol produced during a 24 hour period and leached the remaining residue with hot hexane. Recrystalization from the hexane followed by two sublimination steps at room temperature produced only 7.7% of the theoretical yield.

An illustrative reaction using ethylorthoformate may be represented as follows:

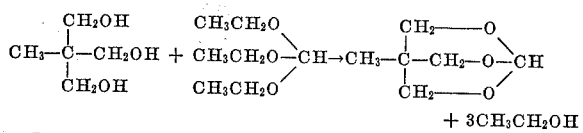

+ 3CH₃CH₂OH

In accordance with the nomenclature given above, the product would be called 4-methyl 2,6,7-trioxabicyclo-2, 2,2-octane.

The prior art method outlined above is slow, the procedure and handling steps are relatively difficult, and the yield is low.

An important object of this invention is to provide a new and improved process for preparing 2,6,7-trioxabicylo (2,2,2) octanes, that is more economical and much faster than the prior art process.

It is another important object of this invention to provide a new method of preparing 2,6,7 - trioxabicyclo (2,2,2) octanes having much higher product yields.

According to the present invention it has been found that by reacting a 1,1,1-trishydroxymethylalkyl compound and an ortho ester in the presence of an inert solvent and a catalyst, the reaction proceeds at a much faster rate, the handling steps are easier to perform and much higher yields are obtained.

The reaction of this invention is a general reaction; not only trimethylol ethane but also its homologues, such as trimethylol propane react in a similar manner, as do the homologues of ethyl orthoformate, such as ethyl ortho acetate.

The term "solvent" as used in this invention refers to inert solvents that have some solubility for the product and thereby facilitate the removal of alcohol produced during the reaction.

Alcohol removal is facilitated in a solvent having a higher boiling point than the alcohol formed, and in a solvent that forms a constant boiling mixture with it. Typical examples of such solvents include mono- and di-aliphatic, halo, alkoxy substituted aromatic and alicyclic compounds such as cyclohexane, benzene, toluene, etc.; polychlorinated aliphatic compounds such as trichloroethane and dichloropropane; thiophene; 1,4-dioxane; tetrahydro-furane; dialkyl ethers; etc.

The use of an inert solvent differs from the prior art practice of using equivalent amounts of reagents. The prior art process produces a reaction mass that is a gummy solid at room temperature. Gum-like materials are difficult to handle because they cannot be crystallized, filtered or put through the usual treating operations.

The use of a catalyst also differs from the prior art which relied only on the removal of the alcohol formed in the reaction to drive the reaction to completion.

By using both an inert solvent and a catalyst the reaction is accelerated to a very important extent. This is illustrated by the fact that the reaction time of 24 hours needed for the Doering et al. process is reduced by the instant process of 3 hours when producing 4 methyl, and to 7 hours when producing 4-ethyl-2,6,7-trioxabicyclo (2,2,2) octane.

Any catalytic material promoting the reaction can be used in the process of this invention. The preferred catalysts are Lewis acids such as boron trifluoride, boron trifluoride etherate, tin tetrachloride, zinc chloride, sulphuric acid, etc.

Best results from the standpoint of high yields and product purity are obtained by neutralizing the catalyst before toluene removal. In the presence of the acid catalyst, the higher temperature between 130–145° C., combined with the relative absence of solvent resulting from toluene removal causes product breakdown. Neutralizing the catalyst prevents or reduces product breakdown during solvent removal.

Any neutralizing basic material may be used to neutralize the acid.

It is possible to conduct this reaction in an inert solvent without using a catalyst and still obtain the advantages of a higher yield and easier handling, than one obtains when not using an inert solvent. However, the use of a catalyst that is neutralized after the reaction speeds up the reaction, and increases the yield still further.

The trishydroxymethyl alkyl reagents used in this invention are trihydric alcohols having the general structure:

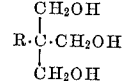

They can be produced by the following condensation reaction:

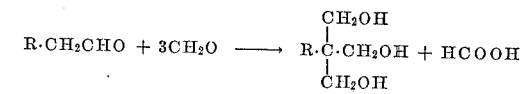

where R may be hydrogen or an alkyl group. The ortho esters used in this invention are alkyl o-esters having the general structure

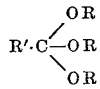

where R' is hydrogen or a lower alkyl radical and R is a lower alkyl radical, such as methyl or ethyl.

Preferably the alkyl group represented by R in both the trihydric alcohol and the ortho ester are lower molecular alkyls of 1–6 or 8 carbon atoms.

The general procedure of this invention is to place the reactants, the catalyst, and the solvent into a reaction vessel, and heat the mixture to drive off the alcohol formed during the reaction either as an azeotrope formed with the solvent, or as fraction driven off from the higher boiling solvent. After all of the alcohol is removed the catalyst is neutralized, filtered and the inert solvent remaining driven off by distillation. Hexane is then added and the mixture is allowed to stand overnight. The product which crystallizes from solution during this time is filtered off and dried. More product can be obtained by adding more hexane to the mother liquor and recrystallizing the solution.

In the examples that follow certain abbreviations have been used to facilitate tabulation; they are to be understood to have the following meanings:

TEOF is triethylorthoformate,
TEOA is triethylorthoacetate;
Alc. NaOCH$_3$ is a sodium methylate solution in methanol containing the equivalent of 12% sodium;
L.T. is liquid temperature;
V.T. is vapor temperature; and
S.G. is specific gravity.

Examples 1 and 2 show the results obtained when both an inert solvent and a catalyst are used.

EXAMPLE I

Object

To prepare 4-methyl-2,6,7-trioxabicyclo (2,2,2) octane by reacting trimethylol ethane with triethyl orthoformate in the presence of BF$_3$ etherate, and to attempt to overcome the difficulties of isolation experienced without a solvent by carrying out the experiment using toluene as a solvent.

Materials

| | | |
|---|---|---|
| (1) TEOF (1.05 moles) | gms | 155.5 |
| (2) Trimethylol ethane (1.0 mole) | gms | 120.0 |
| (3) BF$_3$ etherate (catalyst) | cc | 0.5 |
| (4) Toluene | cc | 1000 |
| (5) Alc. NaOCH$_3$ (catalyst neutralizer) | ml | 2.0 |

Procedure

The reactants were loaded toegther and heated to reflux. The apparatus was equipped with a partial takeoff head for azeotropic removal of alcohol. In 3 hours 128 gms. of CH$_3$CH$_2$OH were removed. L.t.—87–115° C., v.t.—77–110° C. Following the azeotropic alcohol removal, the mixture was neutralized and filtered. Then 660 ml. of toluene were atmospherically distilled from the reaction mixture. 340 cc. of hexane were added to the residue and allowed to stand overnight during which time product crystallized in yellow needle-like crystals. This was cooled to −10° C. and from this 50% v./v. hexane-toluene mixture was filtered 72 gms. of crude product. M.P.—95.8–104.6° C.

A. The mother liquor was evaporated to 140 cc. toluene. To this was added 200 cc. hexane. 10 additional gms. of crude product precipitated —M.P.—104.7–105.9° C. The mother liquor was completely evaporated to give 45 gms. of viscous liquid. I.R. spectrum showed this to be an impurity.

B. 50 gms. of the original 72 gms. were recrystallized from 1 liter of hexane. 26 gms. were recovered at room temperature, M.P.—105.6–107.8° C. A small amount of additional solids were recovered by chilling the filtrate to 12° C. M.P. of these solids—106.8–107.9° C.

These two yields of solids were combined and recrystallized (1 gm./20 ml.) from hexane. The purified product recovered gave the following analysis:

M.P., 106.2–106.6–107.1° C.
Assay—99.9% by ortho ester analysis;
An I.R. spectrum was run and showed the absence of hydroxyl and carbonyl absorption, thereby confirming the 99.9% product purity rating.

A small amount of this purified product, when allowed to stand in air, sublimed leaving only a trace of liquid residue. The I.R. spectrum of this residue showed absorbency in OH and carbonyl regions.

Crude yield:
  1st crop 72 gms.=55.4% of theory
  2nd crop 10 gms.=7.7% of theory
Recrystallized yield: 37.4 gms. approximately 28.8% theory.

EXAMPLE II

Object

To prepare 4-methyl-2,6,7-trioxabicyclo (2,2,2) octane by the procedure described in Example I.

Materials

| | | |
|---|---|---|
| TEOF (1.05 mole) (5% xs) | gms | 155.0 |
| Trimethylol ethane (1.0 mole) | gms | 120.0 |
| BF$_3$ etherate | ml | 0.5 |
| Toluene | ml | 1000.0 |
| Alc. NaOCH$_3$ | ml | 2.0 |

Procedure

Same as Example I. In 3 hours the alcohol-toluene (300 ml.) azeotrope contained 124.8 gms. alcohol or 90.5% of theory. The catalyst was neutralized, the reaction mixture filtered and 660 ml. toluene removed at atmospheric pressure; 340 ml. hexane was added and the product precipitated on standing overnight. This was cooled to 10° C., filtered and air dried for two hours. Dry weight 74.5 gms. (M.P. 105.6–107.2° C.; assay—98.2%, color—off white). The product was a heavy hard crystal. The crude yield was 57.3%.

Examples 3, 4, 5 and 6 are similar to Examples I and II but produce a homologue of 4-methyl-2,6,7-trioxabicyclo (2,2,2) octane.

EXAMPLE III

Object

To prepare 4-ethyl-2,6,7-trioxabicyclo (2,2,2) octane.

Materials

| | | |
|---|---|---|
| TEOF (1.05 ml.) | gms | 155.5 |
| Trimethylolpropane (1.0 mole) | gms | 134.0 |
| BF$_3$ | cc | 0.5 |
| Toluene | liter | 1 |
| Alc. NaOCH$_3$ | ml | 2.0 |

Procedure

The reactants were mixed together and heated to reflux. Ethanol was removed azeotropically through a partial takeoff head.

| | | |
|---|---|---|
| L.T. | °C | 87–115 |
| V.T. | °C | 77–110 |
| Refl. ratio | | 2:1 |
| Vol. | cc | 300 |
| S.G. | | 0.8245 |
| Wt. alc. | | 129.2 |
| Percent of theory | | 93.7 |

The reaction mixture was neutralized, filtered and 735 cc. of the toluene was atmospherically distilled from the reaction mixture. L.t.—116—145° C., v.t.—107–110° C. Then 200 cc. of hexane were added to the residue and the mixture was allowed to stand overnight. During this period the product crystallized out of solution and was filtered off. Dry weight solids—78 gms. An additional 200 cc. of hexane was added to the filtrate and the total chilled to 15° C. and filtered. Dry weight solids—17 gms.

M.P.:

|  | ° C. |
|---|---|
| 1st crop | 62.8–64.6 |
| 2nd crop | 63.2–65.5 |

These two crops were combined and recrystallized from 380 cc. hexane. Return—89.5 gms.

The original mother liquor, containing 400 cc. of hexane and 106 cc. toluene was evaporated and from it were collected 24 gms. of crude product. This was recrystallized from 96 cc. of hexane. This crystallized material (16. gms.) yellowed on standing and became gummy.

Overall yield (crude)—95 gms., 66% of theory
Yield product (pure)—89.5 gms., 62.2% of theory
M.P. of pure product—63.2–63.7–65.0° C.
Assay of pure product—99.3%

The 95 gm. yield does not include the 24 gms. of material obtained from the evaporation of the hexane-toluene mother liquor.

EXAMPLE IV

Object

To prepare a large amount of 4-ethyl-2,6,7-trioxabicyclo (2,2,2) octane.

Materials

| (1) TEOF (7.35 moles) | gms | 1088 |
|---|---|---|
| (2) Trimethylol propane (7 moles) | gms | 938 |
| (3) BF$_3$ etherate | ml | 3.5 |
| (4) Toluene | liters | 7 |
| (5) Alc. NaOCH$_3$ | ml | 14 |

Procedure

Materials (1)–(4) were mixed together and heated to reflux to produce 845.8 gms. (87.7% theory) of alcohol which was azeotropically distilled, l.t.—77–110° C.

Following alcohol removal, 4,905 ml. of toluene were atmospherically distilled from the reaction mixture. Then 2,494 ml. (twice the volume of remaining toluene) of hexane was added to the residue and allowed to stand overnight. During this standing period a rubbery mass formed. The reaction mixture was reheated, neutralized with item (5), treated with 5 gms. activated carbon (Nuchar) and 10 gms. of diatomaceous earth (Super Cel), refluxed for 1 hour and filtered. On cooling the filtrate, the rubbery mass again formed, and the reaction was discontinued.

Conclusions

The reaction must be neutralized before removal of the toluene solvent.

The activated carbon and diatomaceous earth were used as absorbents to aid in initiating crystalline product precipitation by absorbing the gummy polymeric material. As noted their use in this instance did not prevent reformation of the gummy mass. Their use in successful reactions would be optional.

EXAMPLE V

Object

To prepare a large quantity of 4-ethyl-2,6,7-trioxabicyclo (2,2,2) octane as in Example IV, except the catalyst will be neutralized before solvent removal.

Materials

| TEOF (6.04 m.) | gms | 893.0 |
|---|---|---|
| Trimethylolpropane (5.75 m.) | gms | 770.0 |
| BF$_3$.Et$_2$O | ml | 3.0 |
| Toluene | ml | 5750 |
| Alc. NaOCH$_3$ | ml | 12.0 |

Procedure

The reactants, solvent and catalyst were mixed together at room temperature in a 12 liter flask equipped with a short Vigreaux on top of which was positioned a partial take-off head. Heating at atmospheric pressure collected 1880 ml. distillate in a reaction time of 7 hours, v.t. 78–105°, l.t. 89–115° C.; specific gravity of distillate 0.8290; percent alcohol—50%; weight of alcohol—745 gms. (16.2 m.) (94% of theory); color of residue—pale yellow. Neutralized immediately at 90° with alc. NaOCH$_3$. The reaction mixture was cooled, filtered and toluene removed under 15″ vacuum (total removed—4400 ml.; l.t. 130° C.); 1200 ml. hexane was added, the slurry cooled to 10° C. and the heavy white solids filtered and air dried for two hours. Dry weight—607 gms. (off-white "heavy" crystals). Assay—97.7%, M.P. 62.2–64.0° C., atm. B.P. 218–219°.

The crude yield was 73.5% based on trimethylolpropane, 70.0% based on TEOF. There was no evidence of decomposition.

EXAMPLE VI

Object

To prepare 1-methyl - 4 - ethyl-2,6,7-trioxabicyclo (2,2,2) octane by the BF$_3$ catalyzed reaction of trimethylol propane and triethyl orthoacetate in a manner similar to the preparation of 4-ethyl-2,6,7-trioxabicyclo (2,2,2) octane, shown in Example III.

Materials

| (1) TEOA (1.05 moles) | gms | 170.0 |
|---|---|---|
| (2) Trimethylolpropane (1 mole) | gms | 134.0 |
| (3) BF$_3$ solution | cc | 0.5 |
| (4) Toluene | liters | 1 |
| (5) Alc. NaOCH$_3$ | ml | 2.0 |

Theory 1 mole of product 158 gms.

Procedure

Mix materials 1, 2, 3 and 4 and heat to reflux. Remove the ethanol and toluene azeotrope through partial take-off head. (Composition ⅔ ethanol, ⅓ toluene). The vapor temperature at which pure azeotrope was removed was 77°. When the vapor temperature reached 110°, the B.P. of toluene (4.5–5 hours), the reaction was over. The reaction mix was cooled and (5) was added to neutralize (3). The mixture was then filtered and the toluene distilled until approximately 200 ml. of the reaction mixture remained. Care was taken not to allow the temperature to exceed 140°. The concentrated reaction mix was then added to an equal volume of n-hexane and allowed to sit overnight. This course of action did not produce any crystals as it did in Example III. The reaction mix was then concentrated in a Rinco evaporator and all the hexane and toluene were removed. This yielded 92% of product (144 gms.) which was impure. All attempts to recrystallize the product from solvents were unsuccessful and partial crystallization from itself did not lessen the impurities in either solid or liquid to any extent.

Results

The 92% yield of impure product contain 10% of unknown normal ester. Assay varies around 96% with approximately 10% normal ester included. Regular ortho ester analysis was used.

EXAMPLE VII

Object

To prepare 1-methyl-4-ethyl-2,6,7-trioxabicyclo (2,2,2) octane using the same method as Example VI except an additional 10% of TEOA and 4 drops of $BF_3$ were added when all of the azeotrope appeared to be distilled off. This was done to eliminate the OH impurity which shows up on I.R. of the finished product of Example VI.

Materials

| | | | |
|---|---|---|---|
| (1) TEOA (2.10 moles) | gms | 340.0 |
| (2) Trimethylol propane (2 moles) | gms | 268.0 |
| (3) $BF_3$ | ml | 1.0 |
| (4) Toluene | liters | 2 |
| (5) Alc. $NaOCH_3$ | ml | 4.0 |
| (6) TEOA | gms | 16.2 |
| (7) $BF_3$ | drops | 4 |

Procedure

Same as Example VI; however, when the vapor temperature reached 110° C., cool and add 6 and 7, heat to reflux and then follow normal procedure. Toluene was not mixed with hexane but merely evaporated completely under vacuum using a water eductor. The yield was 95% of theory (302 gms.). Then ⅓ of this yield was distilled under high vacuum (less than 5 mm.). This gave a high yield and excellent purity. Distillation yield 87%; assay—98.5%. The bulk of the yield was then distilled under 3 mm. pressure.

CUT 1

| | Degrees |
|---|---|
| Liquid temperature | 75–76 |
| Vapor temperature | 70–71 |

CUT 2

| | |
|---|---|
| Liquid temperature | 78–83 |
| Vapor temperature | 71.5–73.5 |

CUT 3

| | |
|---|---|
| Liquid temperature | 83–85 |
| Vapor temperature | 74–75 |

ASSAY

| Cut: | |
|---|---|
| 1 | 99.39 |
| 2 | 99.65 |
| 3 | 99.77 |

Results

The product was synthesized in a manner which gave good yields, overall above 90%, and excellent purity, over 99%. It was found that distillation is practical and increased the purity of the product greatly.

Examples A and B were attempts to use the Doering et al. process discussed above, with the addition of a catalyst. In these two examples no inert solvent was used.

EXAMPLE A

The object is to attempt to prepare 4-methyl-2,6,7-trioxabicyclo (2,2,2) octane.

Materials

| | | |
|---|---|---|
| TEOF (2.0 moles) | gms | 296 |
| Trimethylol ethane (2.0 moles) | gms | 240 |
| $BF_3$ etherate | ml | 1.0 |
| Alc. $NaOCH_3$ | ml | 4.0 |

Procedure

TEOF, trimethylol ethane, and $BF_3$ etherate were mixed together and heated slowly to reflux (85° C.). Held at gentle reflux for one hour (solution water white) and the ethanol removed by atmospheric distillation over a stillhead; 165.0 gms. collected as the liquid temperature rose to 100° C. The catalyst was neutralized and the reaction mixture held at room temperature overnight. Reheated at atmospheric pressure, the alcohol collected at a liquid temperature of 140° C. distilled much more slowly from the alkaline solution. Vacuum (to 25 in.) was applied when the temperature reached 140° C. and distillation continued until solids started to sublime on the stillhead. The total alcohol removed was 212 gms.; 76.8% of theory.

The residue was cooled and extracted with 2–500 ml. portions of hot hexane. A small amount of gummy solid precipitated from hexane on cooling.

EXAMPLE B

The object is to attempt to prepare 4-methyl-2,6,7-trioxabicyclo (2,2,2) octane by following the procedure described in Example A except the catalyst will not be neutralized.

Materials

Same as Example A without Alc. $NaOCH_3$.

Procedure

Same as Example A except the catalyst was not neutralized. Liquid temperature rose to 140° C. and vacuum applied at this point until the solids started to sublime. Total alcohol collected—256.5 gms.; 93.0% of theory.

Then 800 ml. of a 1:1 toluene-ether mixture were added to the very viscous residue. The solids precipitated were filtered and washed with hexane. The hexane wash turned the solids gummy. These gummy solids (131 gms.) were slurried in ether to give 107 gms. of discrete tan solids which were recrystallized from toluene to give 16 gms. of a white solid melting at 122.6–147° C. Assay 80.0% (reflux temperature); 83.4% (room temperature) by typical orthoester analysis.

The solvents from the toluene-ether mother liquor distilled off and an unsuccessful attempt was made to distill residue (max. 1.t—175° C.).

Examples A and B illustrate that the use of a catalyst without the inert solvent did not increase the product yield, and did not facilitate handling of the gum-like material produced.

In the preceding examples hexane was used as a precipitating solvent that functioned to lower the solubility of the product in the reaction when R' is H and R is $CH_3$ or $CH_2CH_3$. Combined with toluene hexane they constituted a mixed solvent system from which the product crystallized. However, where R' is $CH_3$, $CH_2CH_3$ and R is $CH_2CH_3$ the use of hexane in this manner does not yield the desired product. In the latter cases the product was isolated by complete toluene removal and product distillation.

When crystallization is feasible various precipitating solvents or solvent combinations can be used. The preferred precipitating solvents are straight chain alkanes such as hexane, heptane, petroleum ether, etc.

The examples cited above amply show that the process of this invention greatly increases the speed of the reaction, from 24 hours or more, to 3 to 7 hours. The examples also show that this invention greatly increases the product yield, from 7.7% to as high as 62%. Furthermore the examples illustrate that some of the compounds produced by the disclosed process cannot be produced at all without the combined use of an inert solvent and a catalyst.

A generalized description of the class of compounds contemplated by this invention is given above. It might be elaborated by inclusion of the following formulae to indicate the compounds which we have synthesized.

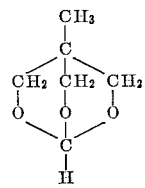

4-methyl, 2,6,7-trioxabicyclo (2,2,2) octane

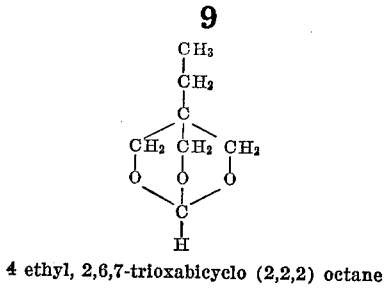

4 ethyl, 2,6,7-trioxabicyclo (2,2,2) octane

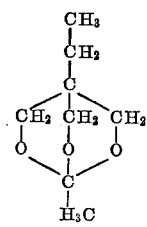

1 methyl, 4 ethyl, 2,6,7-trioxabicyclo (2,2,2) octane

As a matter of record, so far as is known, the following compounds are novel:

(a) 4-ethyl-2,6,7-trioxabicyclo (2,2,2) octane (R'=H, R=CH$_2$CH$_3$)
(b) 1-methyl-4-ethyl-2,6,7-trioxabicyclo (2,2,2) octane (R'=CH$_3$, R=CH$_2$CH$_3$) and
(c) 1,4-diethyl-2,6,7-trioxabicyclo (2,2,2) octane (R'= R=CH$_2$HC$_3$).

That is, three compounds where R=CH$_2$CH$_3$ (R'=H, CH$_3$, CH$_2$CH$_3$) are new, whereas the one compound where R=CH$_3$(R'=H) was reported by Doering.

The cicyclic octanes obtained by using the process of this invention are particularly useful in combination with organic solvents as a wetter getter where it is desired to obtain a product completely free of water. These compounds have an advantage in that only one mole of a trihydric alcohol would be formed per mole of orthoformic ester reacted as compared to three moles of a monohydric alcohol which would be formed from a normal ortho ester.

These bicyclic octanes also may be used as intermediates in organic syntheses, as for example in the formation of new substituted alkoxy methylene compounds, and possibly in the formation of pure normal mono formate.

Since the bicyclic octanes of this invention are unusually stable at tigh temperature, they can be distilled at normal pressures at temperatures of the order of 250° C. without any appreciable decomposition. Also, they can be used as stable heat exchange materials for special purposes.

From the above disclosure and the illustrative embodiments, it is clear that this invention provides a novel and greatly superior process for preparing trioxabicyclo octanes. The process is simple, economical and produces the desired octanes in satisfactory high yields.

We claim:
1. A process for producing 2,6,7-trioxabicyclo (2,2,2) octanes having the formula

I 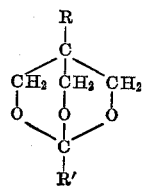

where R' is selected from the group consisting of H, CH$_3$ and C$_2$H$_5$ and R is selected from the group consisting of CH$_3$ and C$_2$H$_5$ which comprises:
(1) introducing and mixing into a reaction zone a reaction mass containing
(a) a trihydric alcohol of the formula

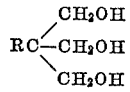

(b) a lower alkyl ortho ester of the formula

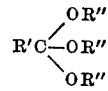

wherein R'' contains 1–8 carbon atoms,
(c) an amount of an inert solvent for (a) and (b) having a higher boiling point than R''OH selected from the group consisting of cyclohexane, benzene, toluene, trichloroethane, dichloropropane, thiophene, 1–4-dioxane tetrahydrofurane and dialkyl esters in an amount sufficient to dissolve (a) and (b), and
(d) a catalytic amount of a Lewis acid selected from the group consisting of boron trifluoride, boron trifluoride etherate, tin tetrachloride, zinc chloride and sulfuric acid;
(2) reacting (a) and (b) to form I by heating the reaction mass of (1) at a temperature which drives off R''OH and part of (c);
(3) neutralizing the Lewis acid of (d) with an alkaline reacting compound;
(4) separating the neutralized Lewis acid from the reaction mass; and
(5) heating the resulting reaction mass to drive off the remainder of (c) thereby recovering (I).
2. The process of claim 1 wherein the neutralized catalyst is separated by filtration.
3. The process of claim 2 wherein the inert solvent is toluene.
4. The process of claim 1 wherein R' is H and a precipitating agent selected from the group consisting of hexane, heptane and petroleum ether is added to (5) to precipitate I.
5. The process of claim 4 wherein the precipitated I is re-dispersed in the precipitating agent and re-precipitated therefrom.
6. The process of claim 1 wherein R' is selected from CH$_3$ and C$_2$H$_5$ and the inert solvent is substantially completely removed.
7. The process of claim 6 wherein the residue is subjected to distillation to remove impurities.

References Cited

Doering et al., Journal American Chemical Society, Vol. 77 (1955), pp. 509–513, QD1A5.

Dae, et al., Journal American Chemical Society, Vol. 83 (1961), pp. 5036–7, QD1A5.

Groggins, Processes in Organic Synthesis, 3rd ed., 1947, McGraw-Hill Book Co., Inc., N.Y., pp. 613 and 624–637.

ALEX MAZEL, *Primary Examiner.*

J. H. TURNIPSEED, *Assistant Examiner.*